United States Patent
Farrugia et al.

(10) Patent No.: US 10,313,474 B1
(45) Date of Patent: Jun. 4, 2019

(54) SYSTEM AND METHOD OF LOAD BALANCING BY OFFLOADING REDUNDANT QUERIES TO CLIENT DEVICES

(71) Applicant: Parallels International GmbH, Schaffhausen (CH)

(72) Inventors: Daniel Farrugia, Sliema (MT); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 333 days.

(21) Appl. No.: 15/350,652

(22) Filed: Nov. 14, 2016

(51) Int. Cl.
*H04L 29/08* (2006.01)
*H04L 12/24* (2006.01)
*H04L 29/06* (2006.01)

(52) U.S. Cl.
CPC ...... *H04L 67/2857* (2013.01); *H04L 41/0813* (2013.01); *H04L 67/1025* (2013.01); *H04L 67/141* (2013.01); *H04L 67/16* (2013.01); *H04L 67/42* (2013.01)

(58) Field of Classification Search
CPC ............ H04M 1/7253; H04N 21/4126; H04N 21/42204
See application file for complete search history.

(56) References Cited

U.S. PATENT DOCUMENTS

| | | | |
|---|---|---|---|
| 5,412,404 A * | 5/1995 | Candy | A63F 13/02 345/211 |
| 7,190,977 B2 * | 3/2007 | Hikishima | H04M 1/0214 455/566 |
| 7,251,478 B2 * | 7/2007 | Cortegiano | H04M 3/4878 455/412.1 |
| 2003/0097659 A1 * | 5/2003 | Goldman | H04L 29/06027 725/89 |
| 2003/0103088 A1 * | 6/2003 | Dresti | G06F 3/0481 715/835 |
| 2005/0282582 A1 * | 12/2005 | Slotznick | H04M 1/215 455/557 |
| 2007/0198656 A1 * | 8/2007 | Mazzaferri | G06F 3/1415 709/218 |
| 2007/0216760 A1 * | 9/2007 | Kondo | H04N 5/76 348/14.02 |
| 2007/0234048 A1 * | 10/2007 | Ziv | H04M 3/56 713/159 |

(Continued)

*Primary Examiner* — Arvin Eskandarnia
(74) *Attorney, Agent, or Firm* — Arent Fox LLP; Michael Fainberg (57) ABSTRACT

A system and method for reducing load on a load balancer by offloading redundant queries to the client. The system and method includes receiving an optimized service listing and determining if a suitable server can be identified without submitting a query to the load balancer. An exemplary method includes receiving, from a load balancing node, a listing of client services hosted by servers remotely coupled to the load balancing node, locally storing this listing and identifying one or more the client services to be transmitted to the client device. The method further includes accessing the listing of client services to determine if one or more of the servers is hosting the identified client service, establishing a connection between the client device and the server, and transmitting the identified client service from the server to the client device.

20 Claims, 8 Drawing Sheets

(56) References Cited

U.S. PATENT DOCUMENTS

| | | | | |
|---|---|---|---|---|
| 2007/0269037 A1* | 11/2007 | Gardiner | ................ | H04L 67/14 379/235 |
| 2009/0030914 A1* | 1/2009 | Goto | ................... | G06F 16/345 |
| 2009/0063690 A1* | 3/2009 | Verthein | ................ | H04L 67/14 709/228 |
| 2009/0149125 A1* | 6/2009 | Slotznick | ............. | H04M 1/215 455/3.05 |
| 2009/0254778 A1* | 10/2009 | Huang | ................. | G06F 3/0481 714/38.12 |
| 2009/0288132 A1* | 11/2009 | Hegde | ................... | G08C 17/02 725/141 |
| 2014/0344453 A1* | 11/2014 | Varney | .............. | H04L 41/0803 709/224 |

\* cited by examiner

SYSTEM AND METHOD OF LOAD BALANCING BY OFFLOADING REDUNDANT QUERIES TO CLIENT DEVICES

TECHNICAL FIELD

The present disclosure generally relates to the field of load balancing in a computer network, and, more particularly, to a system and method for offloading redundant queries to a client device.

BACKGROUND

Load balancing is a technique used in computer networks to distribute workload evenly across two or more computers, network links, central processing units ("CPUs"), hard drives, and the like. Load balancing attempts to avoid overloading a particular resource while also providing better resource utilization, resource throughput, and minimize response times. Typically, load balancing services are provided by a software program or hardware device such as a multilayer switch or a Domain Name System ("DNS") server or the like. Load balancing is commonly used to mediate internal communications in computer clusters (high-availability clusters) or across servers in a network. For example, in a typical server farm environment, each server will report its loading to the load balancer, which will in turn consider each server's load and other parameters when assigning new traffic to a server.

Figure 1:
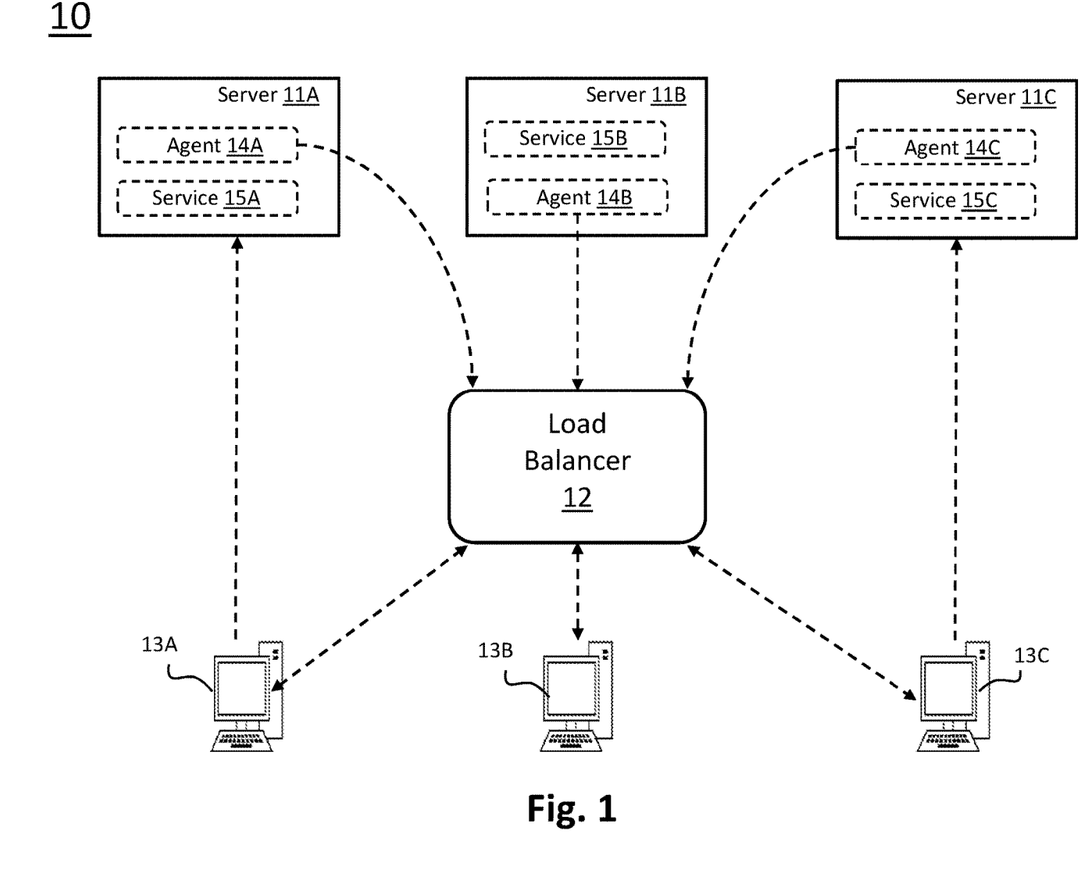
FIG. 1 illustrates a block diagram of a conventional load balancing system.

FIG. 1 illustrates a block diagram of a conventional load balancing system 10. As shown, the system include a number of servers 11A, 11B and 11C, which generally can be considered nodes that host services (e.g., end-user resources such as applications, desktops, files, and the like). Moreover, the servers 11A-11C are communicatively coupled, by a network, for example, to a load balancer 12, which is a node that determines the most suitable server 11A-11C for a particular service as described above. Furthermore, the load balancer 12 is communicatively coupled to one or more client devices 13A, 13B and 13C that are also capable of connecting to the servers 11A-11C and order to access the host services. It should be appreciated that each of these nodes can be a conventional computing device, such as a computer, mobile device, virtual machine or the like.

According to the conventional system 10, server agents 14A, 14B and 14C can be provided on servers 11A-11C, respectively, and are provided as software modules, for example, on which each respective server can collect and send performance counters, such as CPU and memory usage, to the load balancer 12. Moreover, when one or more client devices 13A-13C need/request to access a client service, the particular client device sends a query to the load balancer 12. Based on the performance counters received from the servers 11A-11C, the load balancer 12 has a complete understanding of the load on all servers 11A-11C. Thus, when a client device (e.g., client 13A) needs to access a particular service (e.g., services 15A, 15B, 15C, etc.), the load balancer 12 is configured to determine the most suitable server that is hosting the requested service. In this regard, each client device (e.g., clients 13A-13C) learns what services 15A-15C are available on which servers 11A-11C by sending a query to the load balancer 12 and receiving a list of known services, i.e., a service listing. For example, in one example, a client device may receiving a simple listing of services: Service 1, Service 2, Service 3, and so forth.

The load balancing system 10 illustrated in FIG. 1 has certain technical limitations. For example, this system 10 is limited to the number of requests the load balancer 12 can accept at the same time since all connection requests received from the respective client devices 13A-13C must pass through the load balancer 12. Moreover, resources on the load balancer 12 must be consumed in order to run load balancing algorithms that compute the most suitable server (e.g., servers 11A-11C) for the desired service (e.g., services 15A-15C) that are being requested by a client device. Accordingly, this consumption of resources of the load balancer 12 limits the number of requests that can be accepted at the same time by the load balancer 12. Moreover, latency to communicate from the client devices (e.g., 13A and 13C) directly with servers (e.g., 11A and 11C, respectively) to obtain the requested service is also increased since each client device has to query the load balancer 12 before it can connect to the given server hosting the service. For example, a client device (e.g., client 13A) must wait for a response from the load balancer 12 indicating which server (e.g., "Server 11A") is hosting the requested service and can provide the service to the client 13A.

Figure 2:
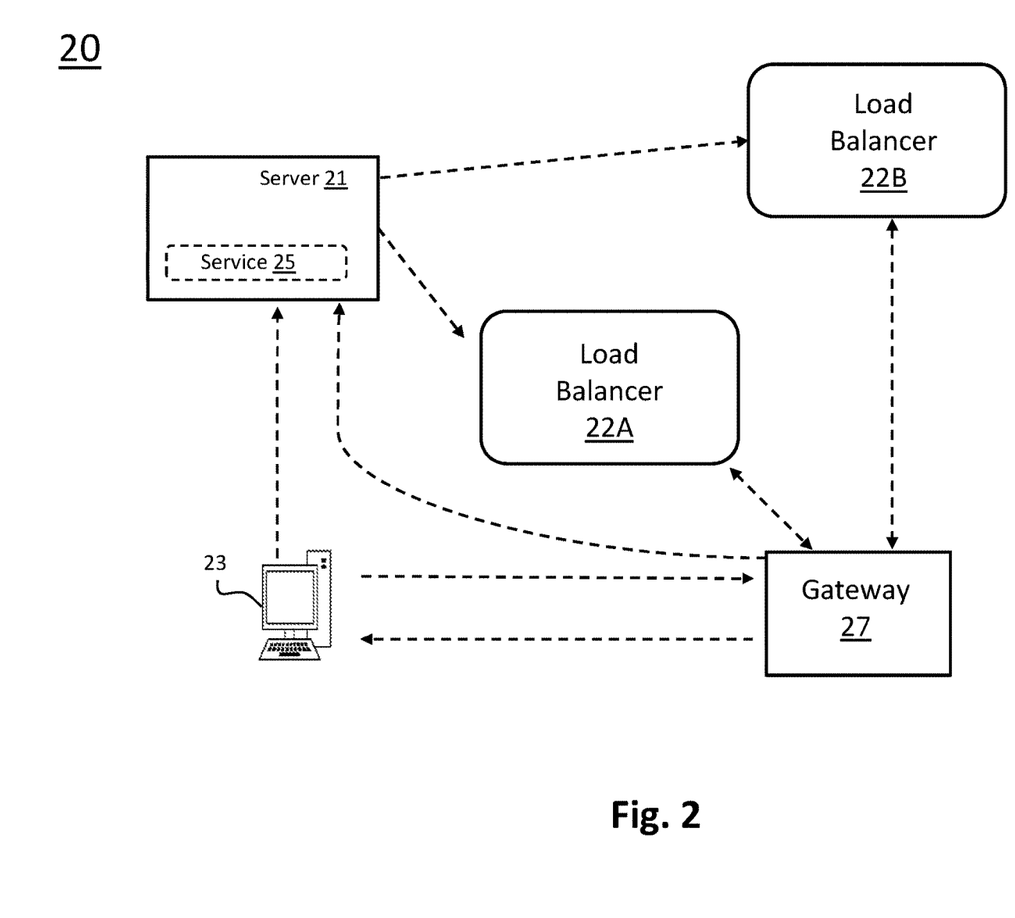
FIG. 2 illustrates a block diagram of another conventional load balancing system.

FIG. 2 illustrates a block diagram of another conventional load balancing system 20. This configuration is similar to the design described above with respect to FIG. 1, but is designed to alleviate scalability issues by distributing load across two or more load balancers 22A and 22B. As shown, an exemplary device 23 must go through a gateway 27 in order to submit requests to one of the load balancer 22A and/or 22B. In this configuration, the gateway 27 is an intermediary node between the client 23 and the load balancers 22A and 22B, and optionally also serves as an intermediary note between the client 23 and the server 21. The gateway 27 is provided to add redundancy to the load balancers 22A and 22B as the gateway 27 is configured to automatically establish a communication connection with one load balancer 22B, for example, if another load balancer 22A, for example, stops responding. Moreover, to prevent overloading, the load balancers 22A and 22B may also be configured to coordinate between them to instruct the gateway 27 as to which load balancer it should forward queries from the client devices (e.g., client 23).

The system 20 illustrated in FIG. 2 improves load balancing performance by allowing a greater number of clients to connect and requests client services at the same time. However, the number of queries from clients that can be accepted is still limited by the resources available on the load balancers 22A and 22B. Once a suitable server (e.g., server 21) is identified, the client 23 can connect directly with the server 21 or through the gateway 27. However, it is clear that latency between the client 23 and the server 21 will inevitably be increased when compared to the system 10 of FIG. 1, since queries, and possibly server connections, must pass through the gateway 27.

Accordingly, a system and method for load balancing is needed that reduces the use of available resources on the load balancer while processing client queries.

SUMMARY

Thus, a system and method is disclosed for reducing load on a load balancer by offloading redundant queries to the client. The disclosed system and method includes receiving an optimized service listing and determining if a suitable server can be identified without submitting a query to the load balancer.

According to one exemplary aspect, a method is provided for offloading redundant queries for load balancing. In this aspect, the method includes receiving, from a load balancing node, a listing of client services hosted by a plurality of servers remotely coupled to the load balancing node; storing the listing of client services in electronic memory of a client device; identifying at least one of the client services to be transmitted to the client device; accessing the listing of client services in the electronic memory to determine if at least one of the plurality of servers is hosting the identified client service to be transmitted to the client device; establishing a connection between the client device and the at least one server hosting the identified client service; and transmitting the identified client service from the at least one server to the client device.

According to another aspect, the method includes determining, by the load balancing node, a configuration change of the at least one server; maintaining, by the load balancing node, a configuration identifier data representing a number of configuration changes of the at least one server; and transmitting the configuration identifier data to the client device to be stored thereon.

According to another aspect, the method includes updating, by the load balancing node, the configuration identifier data based on detected configuration changes of the at least one server; and continuously transmitting the updated configuration identifier data to a gateway node communicatively coupled to the client device.

According to another aspect, the method includes prior to establishing the connection between the client device and the at least one server, querying, by the client device, the gateway node to receive the updated configuration identifier data; comparing, by the client device, the updated configuration identifier data with the configuration identifier data previously stored on the client device; and if the updated configuration identifier data matches the previously stored configuration identifier data, establishing the connection between the client device and the at least one server to transmit the identified client service from the at least one server.

According to another aspect, the method includes, if the updated configuration identifier data does not match the previously stored configuration identifier data, querying, by the client device, the load balancing node to receive an updated listing of client services hosted by the plurality of servers remotely coupled to the load balancing node.

According to another aspect, the method includes querying the gateway node to receive that updated node only after a timeout period has expired; and if the timeout period has not expired, automatically establishing the connection between the client device and the at least one server to transmit the identified client service from the at least one server.

According to another aspect, the method includes querying, by the client device, the load balancing node to receive an updated listing of client services hosted by the plurality of servers remotely coupled to the load balancing node if the accessing of the listing of client services in the electronic memory does not determine that at least one of the plurality of servers is currently hosting the identified client service.

According to another aspect, the system is disclosed for offloading redundant queries for load balancing. In this aspect, the system a client device comprising an electronic memory, and a processor configured to receive, from the load balancing node, the listing of client services hosted by a plurality of servers remotely coupled to the load balancing node, store the listing of client services in the electronic memory, identify at least one of the client services to be transmitted to the client device, access the listing of client services in the electronic memory to determine if at least one of the plurality of servers is hosting the identified client service to be transmitted to the client device, establish a connection between the client device and the at least one server hosting the identified client service, and request the identified client service to be transmitted from the at least one server to the client device.

According to another aspect, a non-transitory computer readable medium comprising computer executable instructions is disclosed for offloading redundant queries for load balancing. In this aspect, instructions are provided for receiving, from a load balancing node, a listing of client services hosted by a plurality of servers remotely coupled to the load balancing node; storing the listing of client services in electronic memory of a client device; identifying at least one of the client services to be transmitted to the client device; accessing the listing of client services in the electronic memory to determine if at least one of the plurality of servers is hosting the identified client service to be transmitted to the client device; establishing a connection between the client device and the at least one server hosting the identified client service; and transmitting the identified client service from the at least one server to the client device.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 3:
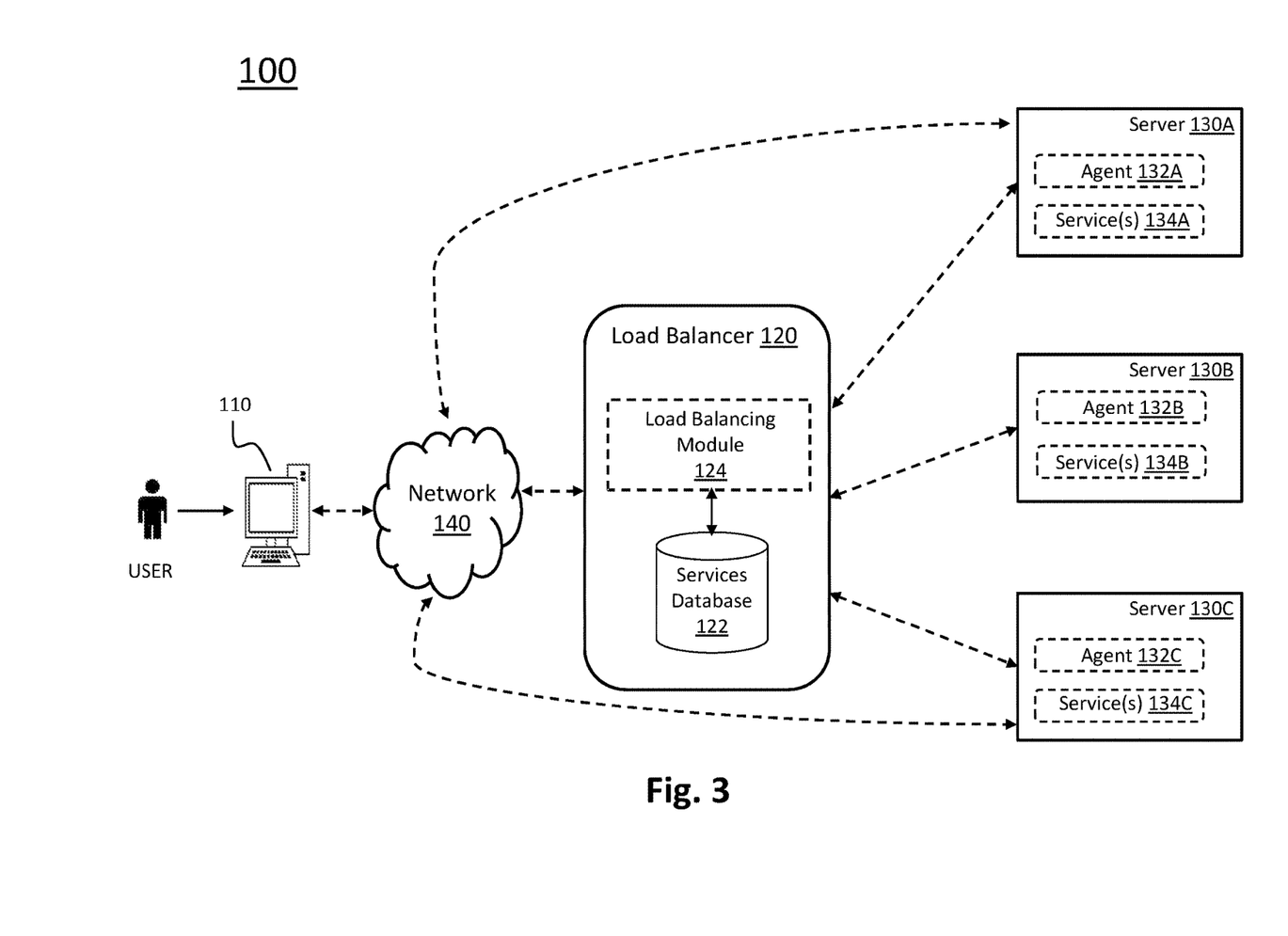
FIG. 3 illustrates a block diagram of a system for offloading redundant queries to a client device according to an exemplary aspect.

FIG. 3 illustrates a block diagram of a system for offloading redundant queries to a client device according to an exemplary aspect. As shown, the system 100 includes a client device 110, which can be any type of computing device (e.g., PC, laptop, tablet, mobile phone or the like) that capable of communicating with other nodes in the system either directly, or through a network 140, as shown in the exemplary aspect. It should be understood that while only a single client device is shown, a plurality of client devices are typically included in the exemplary system with each client device being configured to request client services from one or more services where such requests are managed by a load balancer 120 (i.e., a load balancing node).

Moreover, according to the exemplary aspect, the load balancer 120 of system 100 includes a load balancing module 124 and a services database 122. The details of these components will be described in detail below, but in general the load balancing module 124 is configured to manage the offloading of redundant queries to the client device 110 and the services database 122 is configured to receive a store a list of available services available to each client device.

In a similar configuration as described above, the exemplary system 100 includes a plurality of servers (i.e., three exemplary servers shown as 130A, 130B and 130C) with the servers including a server agent 132A, 132B and 132C, respectively, that is a software module running on the server and is configured to collect resource information on the server, including performance counters, such as CPU and memory usage, and transmit this information to the load balancer 120. In addition, each server 130A-130C includes a one or more services 134A, 134B and 134C, respectively, that are end-user resources such as an application, desktop or file, that can be provided by the servers to the client device 110.

According to the exemplary aspect, the network 140 provided for system 100 can be any type of network for communicating data and data operations between the client device 110 and the load balancer 120. In addition, each of the servers 130A-130C can be communicatively coupled directly to the network 140 and/or client device 110 in order to provide requested services from the servers to the client device. In one exemplary aspect, the network 140 can be a communication system, including the hardware and software as would be appreciated to one skilled in the art, that connects the various components of the system 100 by wire, cable, fiber optic, and/or wireless links facilitated by various types of well-known network elements, such as hubs, switches, routers, and the like. It should be appreciated that the network 140 may employ various well-known protocols to communicate information amongst the network resources. For example, in one aspect, the network 140 can be part of the Internet or intranet using various communications infrastructure such as Ethernet, WiFi and the like.

Figure 4:
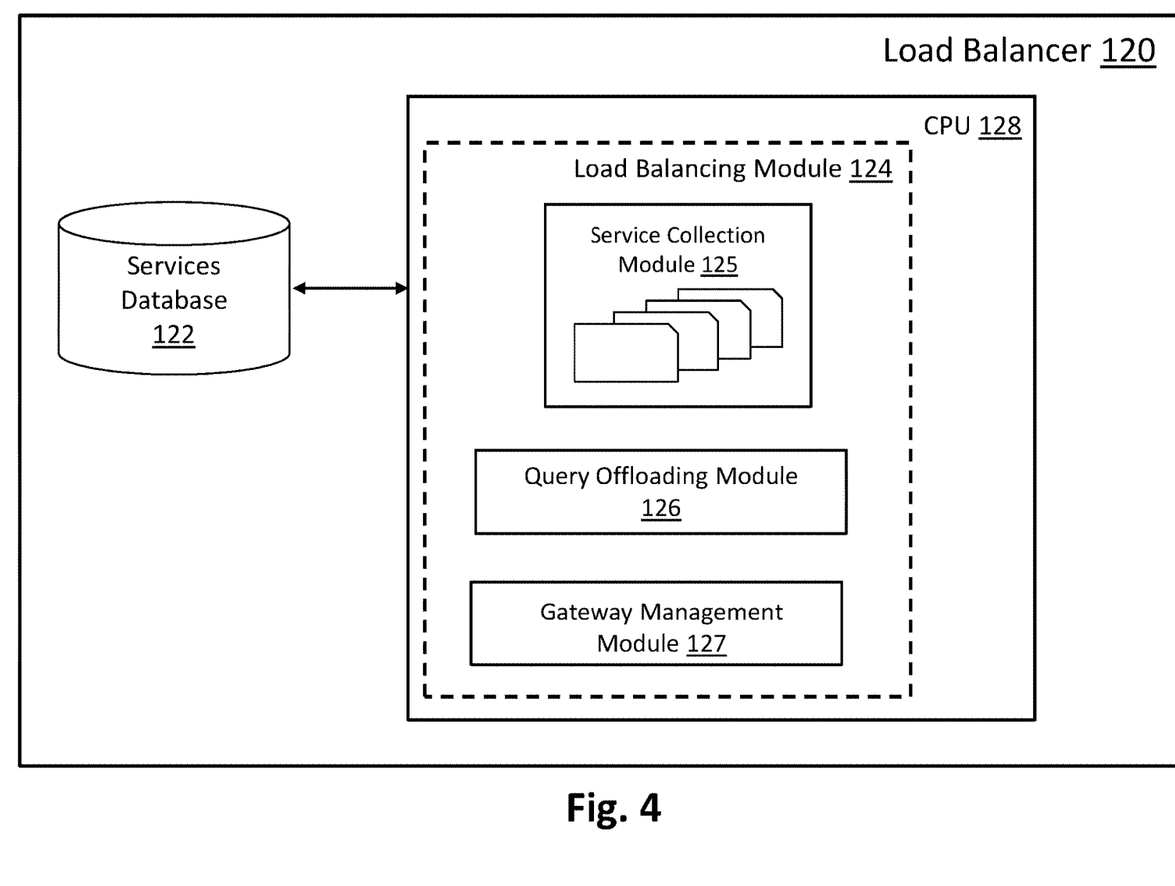
FIG. 4 illustrates a detailed block diagram of the load balancer illustrated in FIG. 3 according to an exemplary aspect.

FIG. 4 illustrates a detailed block diagram of the load balancer 120 illustrated in FIG. 3 according to an exemplary aspect. As shown, the load balancer 120 includes a services database 122 and a load balancing module 124, as described above. Moreover, according to the exemplary aspect, the load balancer 120 is a computing device such as a computer, mobile device or a virtual machine that includes a central processing unit ("CPU") 128 provided to, among other things, execute the load balancing module 124. As will be described below, the load balancing module 124 includes a plurality of sub-modules including services collection module 125, query offloading module 126 and gateway management module 127. Each of these sub-modules can be collectively considered a single module (i.e., load balancing module 124) or separate software modules, with the modules each including software code (e.g., processor executable instructions) in memory, which may be configured to execute/facilitate the offloading of client queries according to an exemplary embodiment, as will be discussed in more detail below.

Moreover, as used herein, the term "module" can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

According to the exemplary aspect, the load balancer 120 improves performance (e.g., increasing the number of queries that can be concurrently processed and reducing latency) by identifying and avoiding redundant queries submitted from client devices (e.g., device 110) to the load balancer 120 and determining directly by the client 110 the most appropriate server (e.g., servers 130A-130C) for the requested service(s).

In this aspect, the service collection module 125 is configured to query each of the servers 130A-130C, respectively, to obtain a listing of available services provided by each server. As described above, such services can include such as an application, desktop or file. For example, these services can be a payroll application, a Windows desktop hosted on a terminal server or virtual machine, a sales forecasting spread sheet, etc.

Upon receiving the listing of services, the service collection module 125 in turn stores the information in services database 122. The services database 122 can be any type of electronic memory, such as read only memory ("ROM") and/or random-access memory ("RAM"), configured to store and continuously update the listing of services provided by each server 130A-130C. In this regard, service collection module 125 is configured to continuously or periodically (e.g., once an hour) query the servers 130A-130C to obtain a current listing of available services. In one aspect, this query can be executed during low processing times of the load balancer 120 when it is not otherwise executing client queries, etc., and has system resources available for performing such queries to servers 130A-130C.

During operation, when a client device (e.g., client device 110) sends an initial query to the load balancer 120 to obtain a service listing (i.e., the list of services known to the load balancer 120 and stored in database 122), the query offloading module 126 of the load balancer 120 accesses the services database 122 and provides a response to the client device 110 that includes a mapping of specific services (e.g., services 134A-134C) paired with specific servers 130A-130C. An example of the response provided by the query offloading module 126 is provided as the following table:

TABLE 1

| Available Service | Hosting Server |
|---|---|
| Service 1 | Server 1 |
| Service 2 | None |
| Service 3 | Server 2 |

As shown, the response of the query offloading module 126 provides an identification of each possible service (e.g., Services 1-3) and the one or more servers (e.g., Server 1, Server 2 and None) hosting the services. It should be appreciated that Server 1 can correspond to server 130A and Server 2 can correspond to server 130B. Moreover, Service 1 can correspond to service 134A and Service 3 can correspond to services 134B, for example. Thus, it should be appreciated that the services listing response identified the services that are only available on a specific server or not available.

According to the exemplary aspect, upon receiving the response from the query offloading module 126 of the load balancer 120, the client device 110 stores the services listing in its local memory (e.g., its cache). Thus, when the client device 110 needs to access one of these services (e.g., Services 1-3), the client device 110 does not need to provide a separate query to the load balancer for each server, but can rather autonomously determine to which server (e.g., Server 1 or Server 2) that it should connect to obtain the requested service.

In one exemplary aspect, if there is more than one server (e.g., Server 1 and Server 2) hosting a service, the client device 110 queries the Load Balancer 120 to determine which server to connect. For example, referring to Service 2 shown in Table 1, by "none" of the servers hosting this service, the Table 1 is indicating to the client device 110 that Service 2 is available, but that the client device 110 has to query the load balancer 120 to identify the optimal server. In this aspect, the load balancer 120 has a complete understanding of the load on all servers and can determine the least loaded server, which should be identified as the server to provide Service 2. Thus, according to one refinement of this aspect, the client device 110 can by-pass the load balancer 120 to directly connect to a server when there is only one server configured for a service (e.g., a payroll application is only installed on the Server 1, which can be a human resources server, for example), and/or a service is available on a server to which the client device 110 is already connected. For example, a client device 110 may already be connected to the human resources server to access the payroll application, but the client device 110 also needs to access the word processor application which is available on the human resources system. Thus, in this aspect, the client device 110 can access the server directly at this time (e.g., via network 140) without going through load balancer 120 to obtain the requested service. For example, if client device 110 seeks to obtain service 1, the client device 110 will reference the load balancer response stored in its local memory and connect directly to server 130A to download service 1 or otherwise request the transmission of service 1 from the list of services 134A.

In another aspect, when there is more than one server that is hosting the same service, a round-robin algorithm may be used. Thus, since the client device 110 has a service listing with identified servers (e.g., Table 2), the client device 110 can use a round-robin algorithm to select a suitable particular server hosting the service, as would be appreciated to one skilled in the art.

In a further exemplary aspect, if the client device 110 needs to communicate with a service that does not have a specific server (for example, Service 2 as shown above), the client device 110 submits a new query to the load balancer 120. In this aspect, the query offloading module 126 of the load balancer 120 provides an additional response with further information to avoid needing to process redundant queries in future. Thus, when the load balancer 120 receives such a query from a client device 110, the query offloading module 126 determines the most appropriate server, and along with the identification of the particular server, the query offloading module 126 sends a list of services that are available on that identified server.

Thus, according to the exemplary aspect as described herein, the software modules (i.e., the agents) are installed on the servers and send performance counters, such as CPU and Memory usage and the like to the load balancer 120. In turn, the load balancer 120 uses this data to determine which is the least loaded server. For example, Server 1 has 50% CPU usage and Server 2 has 25%. In this case, the load balancer 120 determines that Server 2 has less load and would be preferred over Server 1. It should be appreciated that other statistics/counters can also be used for this aspect. Thus, according to exemplary aspects, the load balancer 120 can identify a suitable service using a round-robin algorithm as discussed above, or using statistics related to workload of local resources (e.g., I/O statistics, CPU-utilization statistics, and the like) or of network connections (e.g., latency statistics, jitter statistics, packet loss statistics, and the like).

An example of the response provided by the query offloading module 126 is provided as the following table:

TABLE 2

| Server ID | Service List |
|---|---|
| Server 2 | Service 2, Service 3 |

Similar to the process above, the client device 110 stores this information in its local memory. Thus, if in the future the client device 110 needs to access one of these services (e.g., services 2 and/or 3), the client device 110 reuses the same server to communicate with the service, rather than submitting a new query to the load balancer 120. It should be appreciated that while Tables 1 and 2 are illustrated as separate service listing responses from the load balancer 120 in the exemplary aspect, this responses can be formed as a single response in an alternative aspect.

According to conventional load balancing systems and techniques, load balancers do not transmit any specific server identification information in its service listing or a list of services that are available on each server. Instead, the load balancer simply provides a list of available services. Thus, the client has to query the load balancer each time it wants to access a service in order to determine which server is should connect with to access the service. In contrast, the disclosed system advantageously reduces the consumption of resources on the load balancer 120 by providing the service listings directly to the client device 110. As a result, latency is minimized since the client device 110 can independently determine the most appropriate server to access a requested service.

Figure 5:
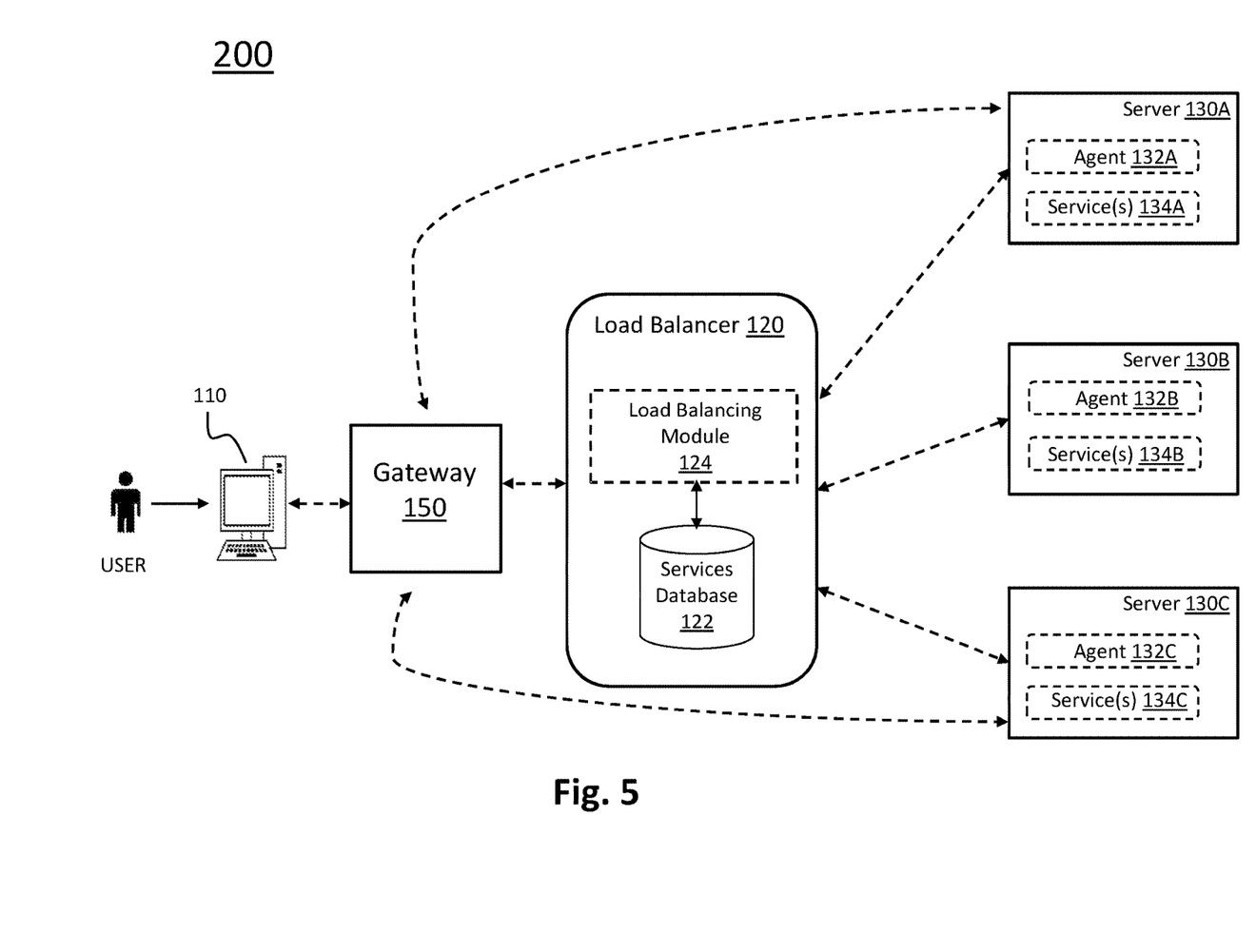
FIG. 5 illustrates a block diagram of a system for offloading redundant queries to a client device according to another exemplary aspect.

FIG. 5 illustrates a block diagram of a system for offloading redundant queries to a client device according to another exemplary aspect. The system 200 as shown includes many of the same components as shown in FIG. 3, the description of which will not be repeated herein. However, in replace of or as part of network 140, a gateway 150 is provided and is communicatively coupled to the client device 110, the load balancer 120, and each of the servers 130A-130C. More particularly, as shown, the gateway 150 is an intermediary node (i.e., a computing device) between the client device 110 and the load balancer 120, and optionally between the client device 110 and the servers 130A-130C.

It should be appreciated that system 200 addresses issues when the certain information in the service listing that is transmitted from the load balancer 120 to the client device 110 as described above, might be invalidated if the configuration on a given server changes. Thus, according to the exemplary aspect, one or more configuration counters (i.e., the configuration identifier data) of each server 130A-130C can be stored on gateway 150. To do so, the gateway management module 127 of the load balancer 120 (see FIG. 4) is provided to identify changes to a particular server's configuration and then notify the gateway 150 to increment the counter. In one aspect, the configuration information for each server is the listing of available servers.

According to one exemplary aspect, an administrator of the system can manually configure the load balancer 120 to specify what services are available on each server. In another aspect, this process can also be performed automatically by the agents (e.g., agents 132A-132C) installed on the servers (e.g., servers 130A-130C). For example, each agent can automatically advise the load balancer 120 when a new application is installed on the respective server. This change of an additional application should be considered an update to the configuration identifier data stored on the load balancer 120 and transmitted to client device 110 and/or gateway 150. It should be appreciated that this approach does not require a continuous polling by the load balancer 120 since the server agents send this information when it changes. Moreover, although the exemplary aspect considers that the server configuration information on gateway 150 is an incremental counter, in an alternative aspect the configuration information can be provided and kept current as a hash, a global unique identified (i.e. a "GUID") or a timestamp, for example.

In one aspect, the counter value for the configuration identifier for each server 130A-130B is included with any of the service listing information transmitted by the load balancer 120 to the client device 110. Thus, whenever the client device 110 needs to a request a service from a particular server, the client device queries the gateway 150 for changes in the counter value. For example, in one aspect, the gateway 150 transmits the current counter value to the client device 110 that compares the value received from gateway 150 with the value previously received from load balancer 120. If the client device detects a change in the counter value, the client device 110 transmits a new query to load balancer 120 for a services listing, such as the information provided in Table 1 and/or Table 2 as described above. Otherwise, if the counter value is consistent, the client device 110 contacts the relevant server directly to download the request services or otherwise have the service transmitted to the client device 110

It should be appreciated that while a comparison of a counter value is described in one exemplary, changes to server configuration can be detected in a variety of different ways. For example, if the configuration identifier is provided as a hash value, the client device 110 will compare the hash value received from the load balancer 120 with the hash value received from the gateway 150. When the updated hash value from the gateway 150 does not match the hash value stored in local memory of the client device 110, the client device 110 can update the information about configuration of the server. In another aspect, the client device 110 can analyse the time stamp. If the time of the last recorded change to the server configuration does not match the time detected by the client device 110, the client device 110 determines that the information of the servers needs to be updated.

In yet a further aspect, the client device 110 may be configured to update its counter value for each server on a periodic basis. Thus, after initially receiving the counter value from the load balancer 120, the client device 110 queries the gateway 150 on a periodic basis (e.g., once an hour or daily) to receive an updated counter value from the gateway 150. Again the client device 110 compares the two values and if there is any inconsistency, the client device transmits a new query to the load balancer 120 for an updated counter value of the respective server. In one further aspect, ether the load balancer 120 and/or client device 110 may be configured to prevent multiple checks in a predetermined time period (i.e., a short time span). Thus, in this aspect, the client device 110 may be configured to perform a counter value check only after a timeout period expires.

Figure 6A:
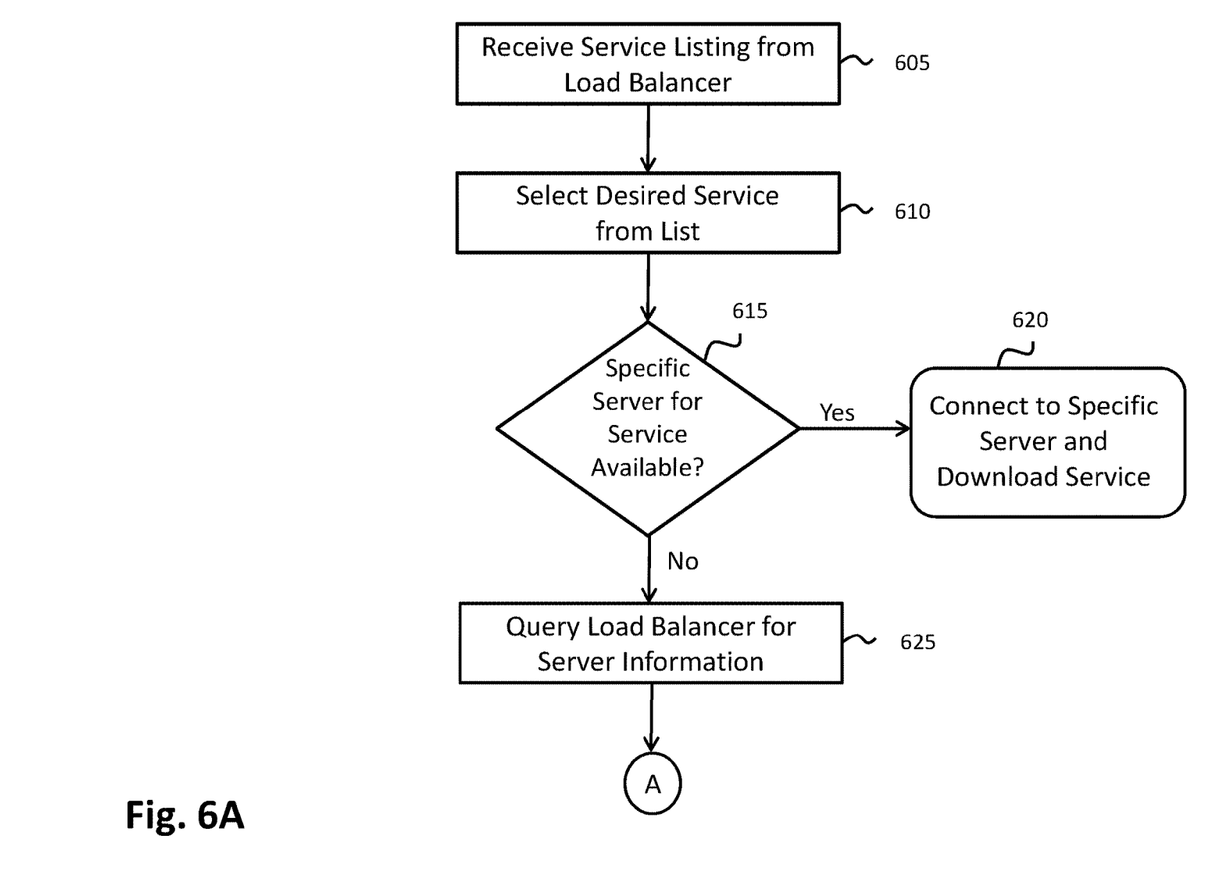
FIGS. 6A-6B illustrates a block diagram of a system for offloading redundant queries to a client device according to an exemplary aspect.
Figure 6B:
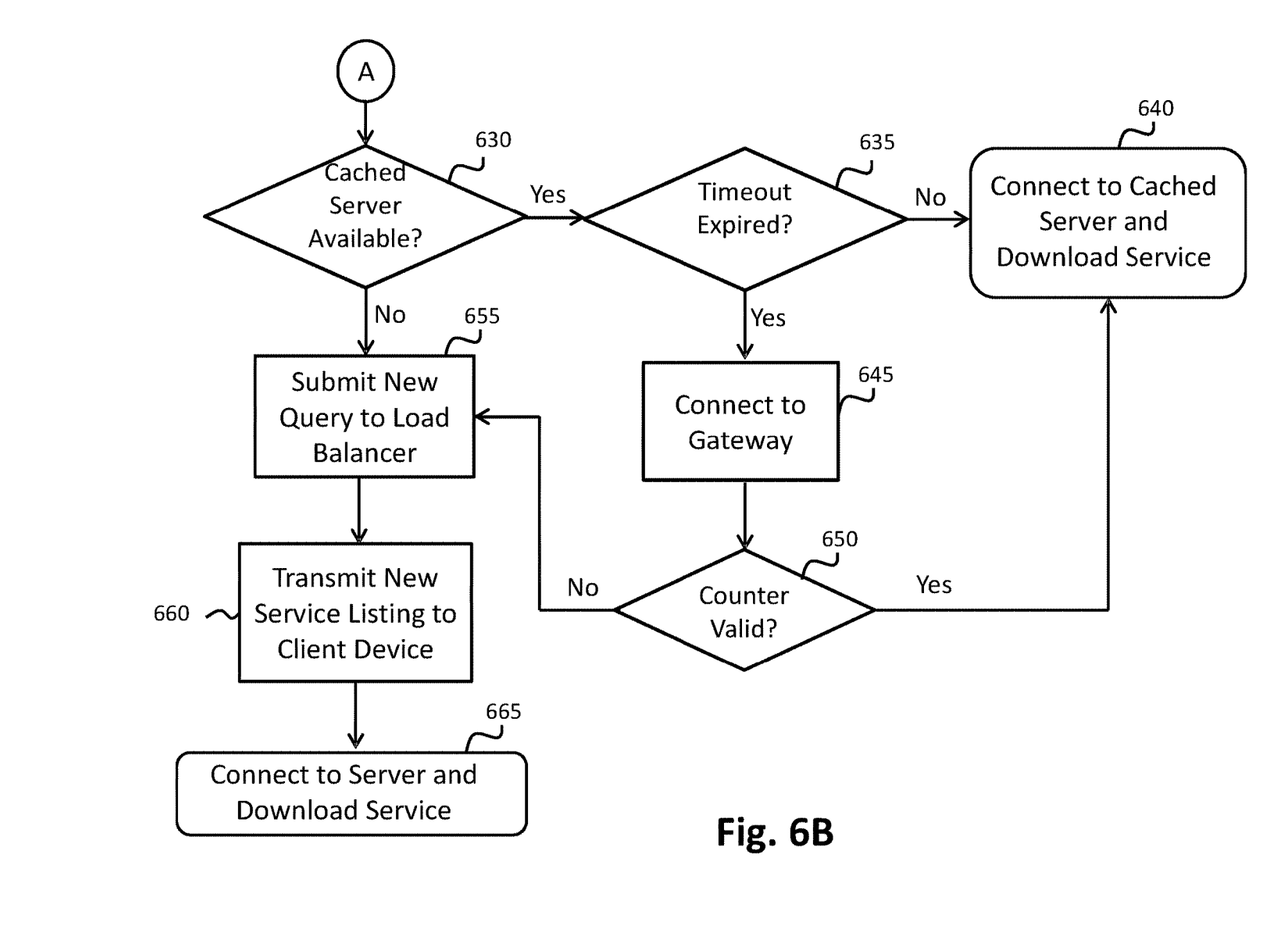

FIGS. 6A-6B illustrates a flowchart for a method for offloading redundant queries to a client device according to an exemplary aspect. Referring first to FIG. 6A, as initially shown at step 605, a client device (e.g., client 110) transmits a query to a load balancer (e.g., load balancer 120) to receive a list of available client device services and servers hosting these services. In response, the load balancer 120 transmits a service listing (e.g., Table 1 discussed above) to the client device 110, which stores the service listing in its local memory. In an alternative aspect, the service listing is transmitted by the load balancer 120 to the client device 110 (or plural client devices) on a periodic basis for example.

Next, at step 610, the client device 110 selects a particular service (e.g., a software application, file or the like) for download. This step can be perform immediately upon receiving the response from load balancer 120 or at a subsequent time since it is stored in memory on the client device 110. Next, at step 615, the client device 110 accesses the service listing in its memory to determine if a specific server that is hosting the service is available. For example, referring to Table 1 above, if the client selects Service 1, the client device 110 determines that Service 1 is available on Server 1 (e.g., server 130A). In this regard, the client device connects directly (through network 140, for example) to the server identified in the service listing at step 620 and downloads or otherwise requests transmission of the service. At this point, the process can be complete and the method can return to step 610 to select another service, for example.

Alternatively, if the specific service is not available from one server at step 615, the method proceeds to step 625. For example, again referring to Table 1, if the client device 110 selects service 2, the service listing indicates that there is no specific server available (i.e., a single server) for that service. As such, the client device 110 submits another query to load balancer 120 for additional information. At this point, it is possible that additional server information may have been updated in the load balancer 120 (since it is subsequent in time to the initial step 605). As such, the load balancer 120 can transmit a response to the server query that identifies a particular server and a listing of available services. For example, referring to Table 2 discussed above, the load balancer 120 may transmit an identified server (e.g., Server 2) that is currently hosting Services 2 and 3. This response is stored in the local memory of the client device (e.g., in the cache memory of client device 110).

Now referring to FIG. 6B, at step 630, if the client device 110 identifies a service to download, the client device 110 accesses the service listing in its cache memory to determine whether a server (e.g., one or more of servers 130A-130C) is available to access the identified service. For example, if the client device wishes to obtain Service 2 (see Table 2), Table 2 stored in the cached memory of the client device 110 will indicate that Server 2 is hosting the service. In one aspect, the client device 110 can then connect to Server 2 in a similar manner as described above, in order to download the service. Alternatively, the client device 110 determines whether a timeout period has expired at step 635, as described above. If no, the method proceeds to step 640 where the client device 110 connects with the server and requests a download of the service. Alternatively, if the timeout has expired at step 635, the method proceeds to step 645 where the client device queries the gateway 150 to obtain a counter value of the particular server (i.e., Server 2). As described above, in one aspect, the load balancer 120 is continuing to query each server and determine changes in server configuration. In another aspect, the agent of the server is transmitting updates to the load balancer 120 upon a change detected at that server. In either case, upon detecting a change, the counter value of that server is updated and transmitted to the gateway 150. Thus, at step 645, the client device 110 queries the gateway 150 and obtains the updated counter value.

Next, at step 650, the updated counter value from the gateway 150 is compared with the previous counter value stored on the local memory of the client device 110. If the two values match (i.e., are the same integer value), the client device 110 determines that its counter value is valid and proceeds to step 640 to connect and obtain the requested service from Server 2. If the counter value is not valid, the client device 110 knows that there has been some type of configuration change to Server 2 and, therefore, proceeds to step 655 to submit a new query to load balancer 120. This step is similar (or the same) as step 605 described above and the load balancer 120 provides an updated service listing to the client device 110 at step 660. Finally, at step 665, if the requested service is available and a corresponding hosting server is available, the client device 110 connects to the server and downloads the requested service. In one aspect, once the counter is checked at step 650, it is then reset regardless of whether it is deemed valid or not valid. Otherwise, one skilled in the art would appreciated that that all subsequent checks for timeout will always expire since the counter would continue to run.

It should be appreciated that according to the disclosed method, because the services listings are stored on the client device 110, the client device 110 does not need to query the load balancer 120 each time it wants to obtain a new service. As a result, the method reduces the consumption of resources on the load balancer 120 and also minimizes latency since the client device 110 can independently determine the most appropriate server to access a requested service.

Figure 7:
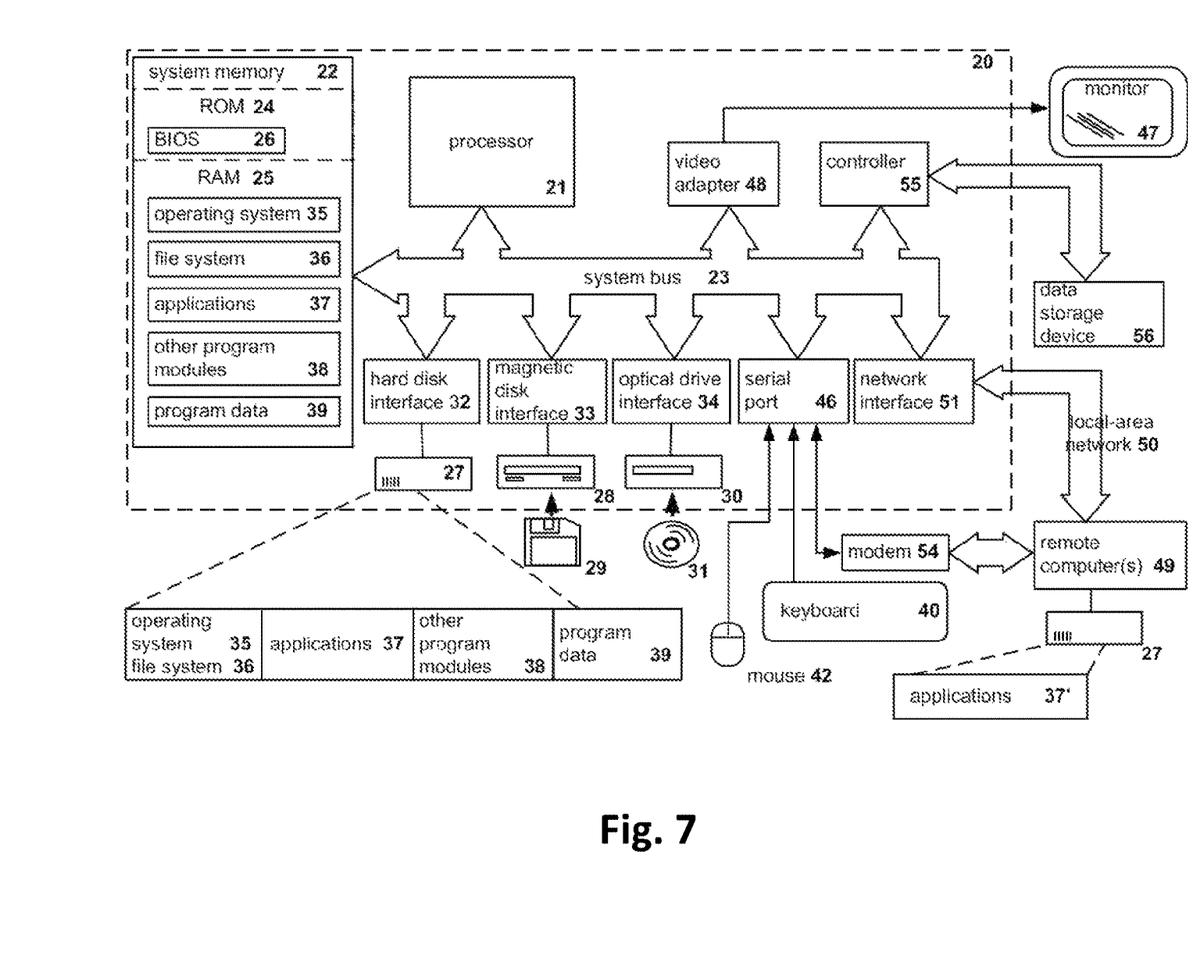
FIG. 7 illustrates an example of a general-purpose computer system (which may be a personal computer or a server) on which the disclosed systems and method can be implemented according to an example aspect.

FIG. 7 illustrates an example of a general-purpose computer system (which may be a personal computer or a server) on which the disclosed systems and method can be implemented according to an example aspect. It should be appreciated that the detailed general-purpose computer system can correspond to any node described above, such as the client device 110 and/or load balancer 120, in order to implement the load balancing algorithms disclosed herein.

As shown, the computer system 20 includes a central processing unit 21, a system memory 22 and a system bus 23 connecting the various system components, including the memory associated with the central processing unit 21. For example, the central processing unit 21 can correspond to the CPU 128 and the system memory 22 can correspond to services database 122, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides an exemplary implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remote computer(s) 49 can correspond to the servers 130A-130B and/or client devices 110, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth. According to one aspect, the networks shown in FIG. 7 can correspond to network 140, as discussed above.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for offloading redundant queries for load balancing, the method comprising:
    receiving, from a load balancing node, a listing of client services hosted by a plurality of servers remotely coupled to the load balancing node;
    storing the listing of client services in electronic memory of a client device;
    identifying at least one of the client services to be transmitted to the client device;
    accessing the listing of client services in the electronic memory and determining if at least one of the plurality of servers is hosting the identified client service to be transmitted to the client device;
    in response to determining that the at least one of the plurality of servers is hosting the identified client service, establishing a connection between the client device and the at least one server hosting the identified client service, otherwise sending a request to the load balancer and receiving server information of at least another server that can host the identified client service; and
    transmitting the identified client service from the at least one server or the at least another server to the client device.

2. The method according to claim 1, further comprising:
    determining, by the load balancing node, a configuration change of the at least one server;
    maintaining, by the load balancing node, configuration identifier data representing configuration changes of the at least one server; and
    transmitting the configuration identifier data to the client device to be stored thereon.

3. The method according to claim 2, further comprising:
    updating, by the load balancing node, the configuration identifier data based on detected configuration changes of the at least one server; and
    transmitting the updated configuration identifier data to a gateway node communicatively coupled to the client device.

4. The method according to claim 3, further comprising:
    prior to establishing the connection between the client device and the at least one server, querying, by the client device, the gateway node to receive the updated configuration identifier data;
    comparing, by the client device, the updated configuration identifier data with the configuration identifier data previously stored on the client device; and
    if the updated configuration identifier data matches the previously stored configuration identifier data, establishing the connection between the client device and the at least one server to transmit the identified client service from the at least one server to the client device.

5. The method according to claim 4, further comprising, if the updated configuration identifier data does not match the previously stored configuration identifier data, querying, by the client device, the load balancing node to receive an updated listing of client services hosted by the plurality of servers remotely coupled to the load balancing node.

6. The method according to claim 4, further comprising:
querying the gateway node to receive the updated configuration identifier data after a timeout period has expired; and
if the timeout period has not expired, automatically establishing the connection between the client device and the at least one server to transmit the identified client service from the at least one server.

7. The method according to claim 1, further comprising querying, by the client device, the load balancing node to receive an updated listing of client services hosted by the plurality of servers remotely coupled to the load balancing node if the accessing of the listing of client services in the electronic memory does not determine that only one of the plurality of servers is currently hosting the identified client service.

8. A system for offloading redundant queries for load balancing, the system comprising:
a client device including:
an electronic memory, and
a processor configured to:
receive, from a load balancing node, a listing of client services hosted by a plurality of servers remotely coupled to the load balancing node,
store the listing of client services in the electronic memory,
identify at least one of the client services to be transmitted to the client device,
access the listing of client services in the electronic memory and determine if at least one of the plurality of servers is hosting the identified client service to be transmitted to the client device,
in response to determining that the at least one of the plurality of servers is hosting the identified client service, establish a connection between the client device and the at least one server hosting the identified client service, otherwise sending a request to the load balancer and receiving server information of at least another server that can host the identified client service, and
request the identified client service to be transmitted from the at least one server or the at least another server to the client device.

9. The system according to claim 8, further comprising the load balancing node being configured to:
determine a configuration change of the at least one server;
maintain configuration identifier data representing a number of configuration changes of the at least one server; and
transmit the configuration identifier data to the client device to be stored thereon.

10. The system according to claim 9, wherein the load balancing node is further configured to:
update the configuration identifier data based on detected configuration changes of the at least one server; and
transmit the updated configuration identifier data to a gateway node communicatively coupled to the client device.

11. The system according to claim 10, wherein the processor of the client device is further configured to:
prior to establishing the connection between the client device and the at least one server, query the gateway node to receive the updated configuration identifier data;
compare the updated configuration identifier data with the configuration identifier data previously stored on the client device; and
if the updated configuration identifier data matches the previously stored configuration identifier data, establish the connection with the at least one server to transmit the identified client service from the at least one server.

12. The system according to claim 11, wherein the processor of the client device is further configured to query the load balancing node to receive an updated listing of client services hosted by the plurality of servers remotely coupled to the load balancing node if the updated configuration identifier data does not match the previously stored configuration identifier data.

13. The system according to claim 11, wherein the processor of the client device is further configured to:
query the gateway node to receive the updated configuration identifier data only after a timeout period has expired; and
if the timeout period has not expired, automatically establish the connection between the client device and the at least one server to transmit the identified client service from the at least one server.

14. The system according to claim 8, wherein the processor of the client device is further configured to query the load balancing node to receive an updated listing of client services hosted by the plurality of servers remotely coupled to the load balancing node if the accessing of the listing of client services in the electronic memory does not determine that only one of the plurality of servers is currently hosting the identified client service.

15. A non-transitory computer readable medium comprising computer executable instructions for offloading redundant queries for load balancing, including instructions for:
receiving, from a load balancing node, a listing of client services hosted by a plurality of servers remotely coupled to the load balancing node;
storing the listing of client services in electronic memory of a client device;
identifying at least one of the client services to be transmitted to the client device;
accessing the listing of client services in the electronic memory and determining if at least one of the plurality of servers is hosting the identified client service to be transmitted to the client device;
in response to determining that the at least one of the plurality of servers is hosting the identified client service, establishing a connection between the client device and the at least one server hosting the identified client service, otherwise sending a request to the load balancer and receiving server information of at least another server that can host the identified client service; and
transmitting the identified client service from the at least one server or the at least another server to the client device.

16. The non-transitory computer readable medium of claim 15, further including instructions for:
determining, by the load balancing node, a configuration change of the at least one server;
maintaining, by the load balancing node, configuration identifier data representing a number of configuration changes of the at least one server; and
transmitting the configuration identifier data to the client device to be stored thereon.

17. The non-transitory computer readable medium of claim 16, further including instructions for:
- updating, by the load balancing node, the configuration identifier data based on detected configuration changes of the at least one server; and
- continuously transmitting the updated configuration identifier data to a gateway node communicatively coupled to the client device.

18. The non-transitory computer readable medium of claim 17, further including instructions for:
- prior to establishing the connection between the client device and the at least one server, querying the gateway node to receive the configuration identifier data;
- comparing the updated configuration identifier data with the configuration identifier data previously stored on the client device; and
- if the updated configuration identifier data matches the previously stored configuration identifier data, establishing the connection between the client device and the at least one server to transmit the identified client service from the at least one server.

19. The non-transitory computer readable medium of claim 18, further including instructions for querying the load balancing node to receive an updated listing of client services hosted by the plurality of servers remotely coupled to the load balancing node if the updated configuration identifier data does not match the previously stored configuration identifier data.

20. The non-transitory computer readable medium of claim 18, further including instructions for:
- querying the gateway node to receive the updated configuration identifier data only after a timeout period has expired; and
- if the timeout period has not expired, automatically establishing the connection between the client device and the at least one server to transmit the identified client service from the at least one server.

* * * * *